Figure 1:
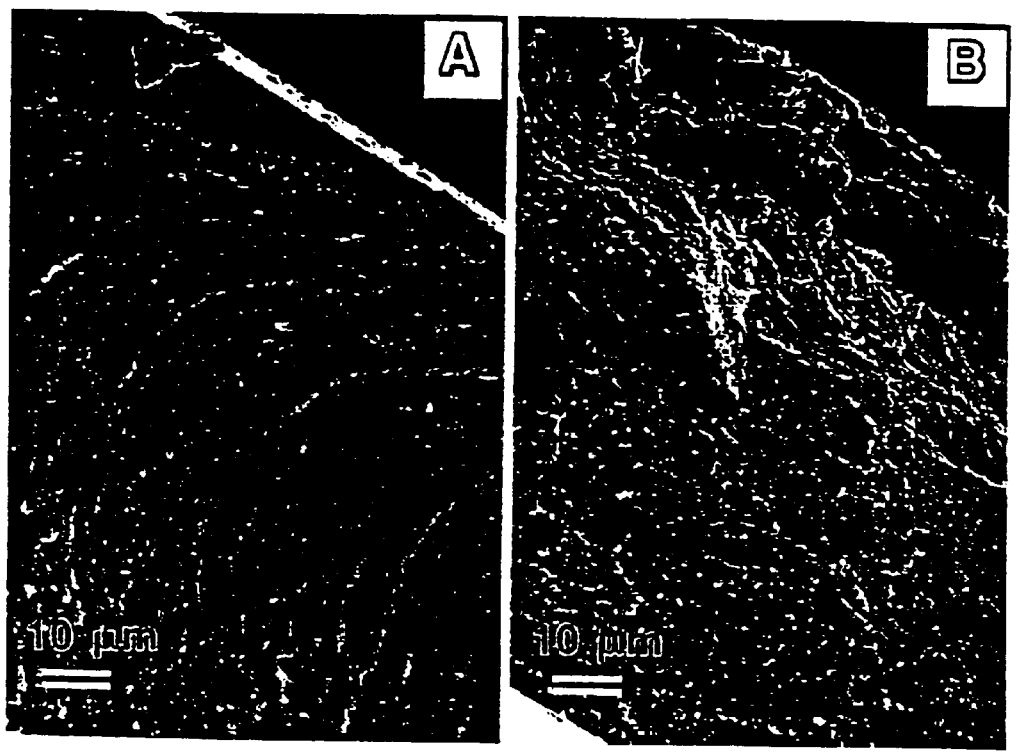

United States Patent [19]
Cavaille et al.

[11] Patent Number: 6,117,545
[45] Date of Patent: Sep. 12, 2000

[54] SURFACE-MODIFIED CELLULOSE MICROFIBRILS, METHOD FOR MAKING THE SAME, AND USE THEREOF AS A FILLER IN COMPOSITE MATERIALS

[75] Inventors: Jean-Yves Cavaille, Claix; Henri Chanzy, La Tronche; Etienne Fleury, Irigny; Jean-François Sassi, Couzon Au Mont d'Or, all of France

[73] Assignee: Rhodia Chimie, Courbevoie, France

[21] Appl. No.: 09/043,945

[22] PCT Filed: Sep. 27, 1996

[86] PCT No.: PCT/FR96/01508

§ 371 Date: Jul. 9, 1998

§ 102(e) Date: Jul. 9, 1998

[87] PCT Pub. No.: WO97/12917

PCT Pub. Date: Apr. 10, 1997

[30] Foreign Application Priority Data

Sep. 29, 1995 [FR] France .................................. 95/11688

[51] Int. Cl.$^7$ .................. C08B 3/20; C08B 3/06
[52] U.S. Cl. .................. 428/357; 428/358; 428/359; 428/400; 428/393; 428/105; 428/107; 428/113; 162/24; 162/26; 162/70; 162/72; 8/116.1; 8/120

[58] Field of Search .................. 428/357, 358, 428/359, 400, 393, 105, 107, 113; 162/24, 26, 70, 72; 8/116.1, 120

[56] References Cited

FOREIGN PATENT DOCUMENTS 919053 of 1963 United Kingdom.

Primary Examiner—Richard Weisberger
Attorney, Agent, or Firm—Jean-Louis Seugnet

[57] ABSTRACT

Cellulose microfibrils, in particular for use as a reinforcing filler or structuring agent in composite materials, a method for making same, and composite materials containing said microfibrils, are disclosed. Specifically, said microfibrils are surface-modified cellulose microfibrils with an L/D ratio higher than 20, preferably higher than 100, and an average diameter of 1–50 nm, where L is the length of the microfibril and D is its average diameter. At least 25% by number of the hydroxyl functions on the surface of the microfibrils are esterified by at least one organic compound including at least one function capable of reacting with the hydroxyl groups of the cellulose. As a result, when the organic compound is a compound that includes acetyl groups such as acetic acid, said microfibrils are used as a reinforcing filler in a material comprising cellulose acetate as the polymeric matrix. The filled composite material may be shaped to provide films, moldings, fibers or yarns.

27 Claims, 2 Drawing Sheets

SURFACE-MODIFIED CELLULOSE MICROFIBRILS, METHOD FOR MAKING THE SAME, AND USE THEREOF AS A FILLER IN COMPOSITE MATERIALS

This application is an application under 35 U.S.C. Section 371 of International Application Number PCT/FR96/01508, filed on Sep. 27, 1996.

The invention relates to cellulose microfibrils which are useful in particular as reinforcing fillers or structuring agents for composite materials.

The invention relates more particularly to surface-modified cellulose microfibrils, to a method for manufacturing them and to their use as reinforcing fillers or structuring agents for composite materials.

It is known to use fibres such as glass, plastic or carbon fibres as reinforcing fillers or structuring agents in composite materials. It has also been proposed to use cellulose fibres of various origins as reinforcing fillers. Thus, European patent No. 0,200,409 describes the use of cellulose fibres of bacterial origin as reinforcers for thermosetting materials. International patent application WO 93/10172 describes the use of cellulose microfibrils of natural origin as reinforcing fillers for thermosetting resins. Mention may also be made of the article by P. Gatenholm et al., published in J. Appl. Pol. Sc. - vol. 45, 1667–1677 (1992) under the title "Biodegradable Natural Composites", which describes the use of natural, and thus biodegradable, fibres, such as cellulose fibres, as reinforcing fillers for composite materials based on biodegradable polymers such as polyhydroxybutyrate or polyhydroxyvalerate.

However, one of the problems encountered in the use of such fillers lies in the difficulty in ensuring good dispersion of the filler in the composite material. The phenomenon of agglomeration of the filler is observed in particular with the cellulose fibres used as fillers for matrices made of thermoplastic resin. Poor dispersion of the filler in the matrix of a composite material seriously affects its mechanical properties. In order to improve the dispersion of the fibres, it has been proposed to chemically modify or to hydrolyse the cellulose fibres. However, in order to obtain a material with properties that are improved by reinforcing fillers, it is necessary to add a large amount of fibres. The use of microfibrils makes it possible to improve the properties of material reinforced with a low level of filler, if the microfibrils are appropriately dispersed in the material. Such a dispersion is often difficult to obtain.

To overcome these drawbacks, the invention proposes surface-modified cellulose microfibrils, and a method for manufacturing these microfibrils. The products of the invention retain the intrinsic properties of cellulose since the microfibrils still consist of an arrangement of unmodified cellulose chains. However, they have a surface containing chemical species whose nature is determined on the basis of the matrix to be reinforced, in order to make the cellulose microfibrils chemically compatible with the matrix in which they will be dispersed.

To this end, the invention proposes surface-modified cellulose microfibrils having an L/D ratio of greater than 20, preferably greater than 100, and an average diameter of between 1 nm and 50 nm (L being the length of the microfibril and D its average diameter). These microfibrils are characterized in that at least 25%, on a number basis, of the hydroxyl functions present at their surface are esterified with at least one organic compound comprising at least one function which can react with the hydroxyl groups of cellulose. This organic compound will be referred to in the rest of the text as the esterifying organic compound. Advantageously, the percentage of esterification is at least 50%.

The organic residues originating from the esterifying organic compounds bound to the surface of the microfibrils ensure compatibility of the cellulose microfibril with the medium in which it is dispersed.

Thus, in the preferred embodiment of the invention, when the esterifying organic compound residue is an acetic radical, the surface-modified microfibrils are compatible in particular with cellulose acetate and will advantageously be able to be used as reinforcing fillers for composite materials based on cellulose acetate, as will be described below.

The cellulose microfibrils can be of any origin, for example of plant, bacterial, animal, fungal or amoebic origin, preferably plant, bacterial or animal origin.

As examples of animal sources of cellulose, mention may be made of animals from the family of tunicates.

The plant sources of cellulose can be wood, cotton, linen, ramie, certain algae, jute, waste from the agrifood industries, or the like.

The microfibrils are obtained from the cellulose sources mentioned above by known processes. Thus, by way of example, the cellulose microfibrils are obtained from wood by treating it with concentrated sodium hydroxide solution in order to remove the lignin and then separating the microfibrils by homogenization in aqueous medium. The microfibrils generally consist of 20 to 1000 cellulose chains organized in parallel.

These microfibrils are then treated with an esterifying medium according to a process which allows the degree of esterification of the microfibrils to be controlled.

Thus, according to one embodiment of the invention, the microfibrils are dispersed in a liquid medium. This liquid should not dissolve the cellulose, nor have an effect on the structure of the cellulose microfibrils.

As suitable liquids, mention may be made of carboxylic acids, aliphatic or aromatic, halogenated or non-halogenated hydrocarbons, polar aprotic solvents and ethyl ether. Anhydrous or "glacial" acetic acid is the preferred medium.

After dispersing the microfibrils, an esterifying organic compound or esterification agent is added to the medium, advantageously with an esterification catalyst and/or an esterification activator.

As esterification agents, mention may be made, by way of example, of carboxylic acids and carboxylic acid anhydrides or halides comprising a saturated or unsaturated hydrocarbon radical which can comprise hetero atoms.

Preferably, the hydrocarbon radical comprises from 1 to 20 carbon atoms and is chosen, for example, from the group comprising methyl, ethyl, butyl, propyl and vinyl radicals and fatty chains.

As preferred esterification agents for the invention, mention may be made, by way of example, of acetic anhydride, butyric anhydride, acetyl chloride, butanoyl chloride and acetic acid.

The esterification catalysts which are suitable for the invention are acid catalysts such as inorganic or organic acids, for instance sulphuric acid, perchloric acid, trifluoroacetic acid and trichloroacetic acid, or basic catalysts, for instance tertiary amines such as pyridine.

As activating agents for the esterification reaction of cellulose, mention may be made, by way of example, of trifluoroacetic anhydride and trichloroacetic anhydride.

The esterification reaction is carried out for a determined period in order to obtain an esterification of the hydroxyl groups present at the surface of the microfibrils. Quenching of the esterification is obtained, for example, either by adding a compound, advantageously water, which makes the esterification agent inactive, or by cooling and/or diluting the medium.

The partially esterified microfibrils are extracted from the medium by any suitable means, in particular by freeze-drying, centrifugation, filtration or precipitation. They are then advantageously washed and dried.

The microfibrils in accordance with the invention have hydrocarbon groups at their surface which allow them to be dispersed in materials which can be shaped for the production of varied articles, such as moulded components, films, fibres, threads, rods or membranes, for example.

The addition of surface-modified cellulose microfibrils has the effect of improving the mechanical properties of these materials. This use as a reinforcing filler is also a subject of the present invention.

The microfibrils in accordance with the invention can also be used as structuring fillers in materials such as paints and varnishes, for example.

Materials reinforced or structured by microfibrils in accordance with the invention, which are also referred to as composite materials, are also subjects of the invention.

As materials which can be reinforced by microfibrils in accordance with the invention, mention may be made, by way of example, of cellulose esters such as cellulose acetate, biodegradable polymers such as polyhydroxybutyrates, hydroxyvalerates, and the resins used in paint, adhesives and inks.

The surface modification of the microfibrils of the present invention makes it possible to obtain very good compatibility between the reinforcing filler and the matrix. This compatibility makes it possible, as in the example of cellulose acetate reinforced with microfibrils surface-modified by acetate groups, to obtain a translucent and even transparent composite material. In addition, it allows very good dispersion of the microfibrils in the matrix to be obtained.

The microfibrils of the invention can be present in the composite materials at very variable concentrations, from a few per cent by weight up to 200% by weight relative to the matrix, for example.

The dispersion of the microfibrils of the invention in the matrix of the composite materials can be prepared according to the known processes for incorporating fillers into a matrix.

One of the preferred processes of the invention consists in dispersing the microfibrils in a solution of the material forming the matrix of the composite material, and then, after shaping the solution, in evaporating the solvent in order to obtain the shaped article. The microfibrils can also be added to the solution of matrix-forming material, in the form of a dispersion in a liquid which is advantageously identical to the solvent for the matrix.

Another advantageous process consists in introducing the microfibrils into the material in the molten state.

Figure 2:
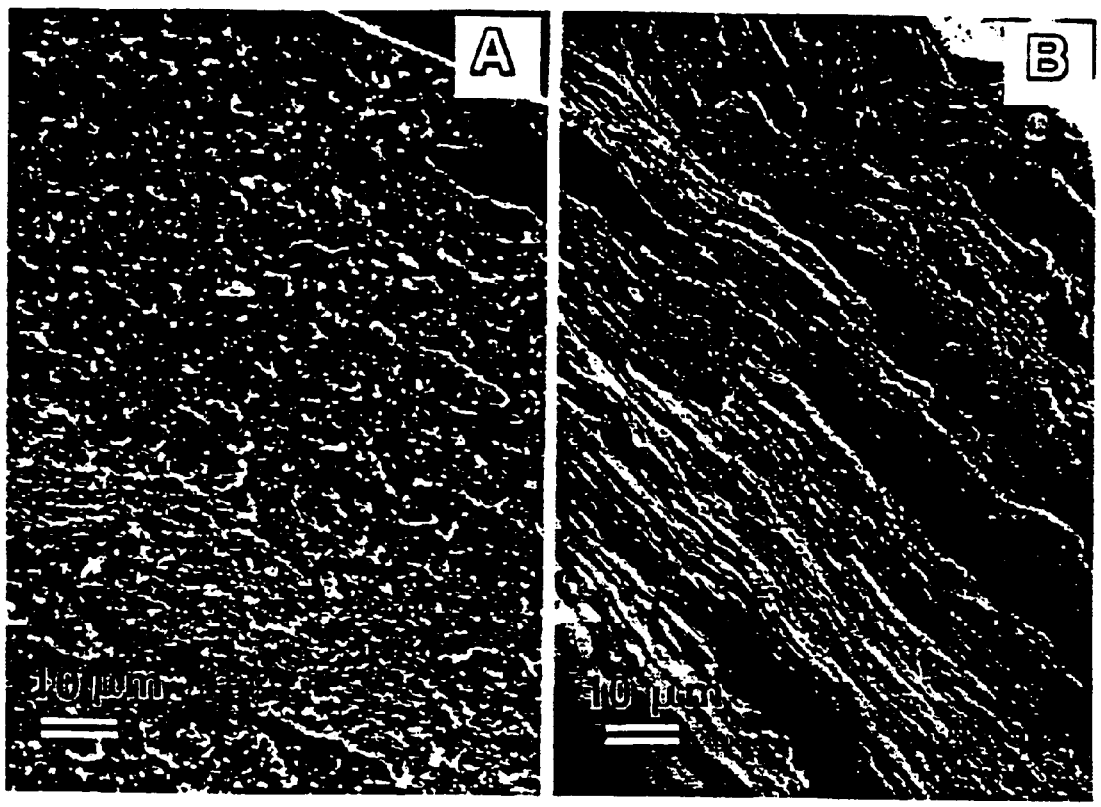

Other details and advantages of the invention will become more apparent in the light of the examples below, given purely by way of illustration and as a guide, and in the light of the attached figures, in which:

FIG. 1 represents a scanning electron microscope view of the rupture of a cellulose acetate film obtained from a collodion in a mixture of acetic acid and water: view A corresponding to an uncharged film, view B corresponding to a film charged with 7% by weight of non-acetylated tunicin microcrystals, and FIG. 2 represents a scanning electron microscope view of the rupture of a cellulose acetate film obtained from a collodion in a mixture of acetic acid and water: view A corresponding to an uncharged film, view B corresponding to a film charged with 7% by weight of acetylated tunicin microcrystals in accordance with the invention.

EXAMPLE 1

Cellulose microfibrils are obtained, according to the process described below, from the sheath of marine animal species belonging to the family of tunicates: *Halocynthia roretzi, Microcosmus fulcatus* and *Halocynthia aurantium*.

The sheaths are first cleaned crudely and then cut into small pieces and bleached by successive treatments with sodium hydroxide and with sodium chlorite solution. The pieces of bleached sheaths are then disintegrated to a suspension in distilled water by passing them through a mixer.

The suspension of fragments obtained is diluted with distilled water to a concentration of about 1% by mass. The cellulose microfibrils are chopped up, by hydrolysis with 65% by weight of sulphuric acid at 80° C. for 30 minutes, into more individually separate microfibrils of shorter length. These chopped and individualized microfibrils are often referred to as microcrystals. This term will be used hereinbelow.

The microcrystals are recovered by filtration and washing with water. The filter cake is redispersed in distilled water with mechanical stirring and then by ultrasound. An aqueous dispersion of cellulose microcrystals is thus obtained.

The cellulose microcrystals recovered as an aqueous dispersion are then subjected to a partial esterification with acetic anhydride in order to obtain surface-modified microcrystals, in accordance with the invention.

The esterification (acetylation) process is described below:

The cellulose microcrystals, recovered as an aqueous dispersion, are resuspended in 100% acetic acid. To do this, in a first stage, water is gradually replaced by acetic acid by distillation on a rotary evaporator (water bath temperature <40° C.). When the acetic acid content of the medium has reached a sufficient level, the dispersion is destabilized and flocculates. The microcrystals can then be isolated by centrifugation. By a succession of centrifugation and dilution operations with 100% acetic acid, a water content of about 0.2% by mass is achieved (according to the assays carried out on the supernatant solution using a Karl-Fischer metrohm coulometer, model 684, with a diaphragm-free cell). A flocculated dispersion of cellulose microcrystals in acetic acid, which is the reaction solvent, is thus obtained.

50 g of such a dispersion (cellulose content: 0.23% by mass) are diluted with 100 g of 100% acetic acid and brought to 60° C. with stirring (700 rpm). 380 µl of a sulphuric acid solution at 4.6% by mass in acetic acid are then added, with the necessary amount of acetic anhydride to neutralize the traces of water. After 5 minutes, a mixture consisting of 5 ml of 98% acetic anhydride and 5 ml of 100% acetic acid is added. After acetylation for 5 minutes, redispersion of the cellulose microcrystals in the reaction medium is observed. The floc present at the start of the reaction disappears. Birefringent regions (liquid-crystal behaviour of the microcrystals) can be observed in polarized light. The reaction medium is then cooled in a bath of ice-water. 25 ml of an aqueous acetic acid solution at 80% by mass are then added in order to destroy the residual acetic anhydride and thus to quench the acetylation of the microcrystals.

The acetylated microcrystals are separated from the reaction medium by freeze-drying. They are then purified by dialysis against water. After dialysis, they are dried by freeze-drying.

These microcrystals have the following characteristics:

L/D=100

D=10 nm

Degree of acetylation of the surface hydroxyls=100%

The degree of acetylation is determined by infrared spectrophotometry.

With these acetylated microcrystals, a reinforced cellulose acetate film was obtained according to the following process:

200 mg of freeze-dried acetylated microcrystals are dispersed in 100 g of acetone of 99.5% purity by vigorous stirring, followed by sonication.

A collodion of cellulose acetate in acetone is prepared by dissolving 10 g of cellulose acetate sold by the company Rhône-Poulenc Tubize Plastics in 90 g of 99.5% acetone.

Reinforced films of cellulose acetate are prepared by mixing a determined amount of the acetone dispersion of the cellulose microcrystals in 10 g of cellulose acetate collodion, the mixture being poured into glass capsules 10 cm in diameter. The solvent is evaporated off at room temperature and then by drying at 45° C. in air. Films about 100 μm in thickness are obtained with variable weight concentrations of acetylated microcrystals, depending on the amount of acetone dispersion added.

For comparative purposes, films of cellulose acetate reinforced by the microcrystals obtained before acetylation are prepared according to the following procedure.

The dispersion of microcrystals obtained by treating tunicate sheaths, before esterification, is concentrated by evaporating off the water. 100% acetic acid is then added. A dispersion containing 0.2% by weight of microcrystals in 50% acetic acid is obtained.

This dispersion is added, in determined amounts, to a collodion of cellulose acetate at 5% by mass in 100% acetic acid. Films are obtained according to the process described above. After evaporation of the acetic acid by drying at 45° C., the films have a thickness of about 100 μm.

The properties of the films are determined according to the following methods.

Mechanical Properties

The reinforced films are cut, using a punch and a hydraulic press, into dumbbell-shaped test pieces with a working length of 19 mm, a width of 4 mm and a thickness of 0.1 mm. These test pieces are placed for 4 days at 25° C. in a desiccator containing saturated aqueous magnesium nitrate solution [$Mg(NO_3)_2.6H_2O$]. At this temperature, the level of humidity above the saturated saline solution is 53%. The mechanical tests are carried out on an Instron 4301 tension machine equipped with a 100 N cell. Pneumatic clamps with serrated clamping jaws are used, which prevents the test piece from slipping during the test. The measurements are taken in an air-conditioned room (thermostatically adjusted to 25° C. and conditioned to 50% humidity). The deformation rate is adjusted to $8.8 \times 10^{-4}$ $s^{-1}$ and the initial length between the jaws is adjusted to 25 mm. For each material prepared, 6 tension test pieces are tested.

The tension test allows the mechanical behaviour of a material to be determined for large deformations. A tensile force is exerted on the material until it breaks, according to a process of loading at a constant deformation rate. During the test, the force F applied to the sample and the elongation Δl are recorded.

The strain δ is calculated according to the expression:

$$\delta = F/S$$

in which S represents the cross-sectional area of the test sample.

If we assume that the material deforms at constant volume and with homogeneous deformation, the cross-sectional area of the test piece is given by:

$$S = S_0 \times l_0 / l$$

in which $S_0$ and $l_0$ are the initial values of the cross-sectional area and the length of the sample.

Moreover, the deformation ε is defined by $$\epsilon = \ln(l/l_0) \cong \Delta l / l_0$$

The modulus of elasticity E (or Young's modulus) is given by the slope at the origin of the strain/deformation curve.

Charge Distribution

The distribution of the microcrystals in the composite material is observed by inclusion of small pieces of reinforced films in a melamine resin sold under the name Nanoplast FB101. The blocks obtained are cut up using a diamond knife at an angle of 35° along a cutting plane perpendicular to the plane of the film. The sections obtained, between 50 and 90 nm in thickness, are transferred onto copper grids coated with a film of carbon. These slices are observed using a transmission electron microscope.

The texture of the composite material is also evaluated by observation with a scanning field emission microscope of a fracture of the film made in liquid nitrogen.

The films reinforced with the acetylated microcrystals are more transparent than the films reinforced with the non-acetylated microcrystals.

Moreover, the observation of the fractures in liquid nitrogen illustrated by FIGS. 1 and 2 for the films with acetylated microcrystals and the films with non-acetylated microcrystals, respectively, shows that the latter films are organized in horizontal sheets.

In contrast, the films reinforced with the acetylated microcrystals are homogeneous and show good dispersion of the filler in the matrix.

The mechanical properties of the various films are collated in Table I below:

TABLE I

| | Films with acetylated microcrystals | | | Films with non-acetylated microcrystals | | |
|---|---|---|---|---|---|---|
| % Filler | E (Gpa) | σ (MPa) | Elongation at break (%) | E (GPa) | σ (MPa) | Elongation at break (%) |
| 0 | 2.8 | 72.5 | 12 | 2.8 | 73 | 12 |
| 1 | 3 | 73 | 11 | 3.1 | 73 | 5 |
| 2 | 3.7 | 83 | 10 | 3.15 | 80 | 6 |
| 5 | 4.05 | 100 | 9 | 3.25 | 93 | 5 |
| 7 | 4.2 | 106 | 9 | 3.5 | 97 | 4 |

E = modulus of elasticity
σ = breaking strain

EXAMPLE 2

Cellulose microcrystals are prepared from cotton linters according to the procedure below:

20 g of cotton linters are placed in 1 l of distilled water and disintegrated for 10 min at 30–40° C. in a Waring "Commercial Blender" mixer. The ground material is drained on a sinter of porosity 2 (pore diameter of between 40 μm and 90 μm). 280 ml of 65% by weight sulphuric acid precooled in a bath of ice-water to a temperature of about 5° C. (in order to avoid excessive yellowing of the medium) are added. The mixture is placed in a 500 ml round-bottomed flask equipped with an efficient mechanical stirrer and is transferred into an oil bath at 75° C. It is kept in this way for 30 minutes, during which time the temperature in the flask reaches 70° C. After dilution with 250 ml of distilled water, the microcrystals are washed with distilled water by successive centrifugations. After 3 to 4 cycles, the supernatant remains cloudy. The contents of the centrifugation tube are then dialysed for 2 days. Next, treatment with ultrasound (Branson Sonifier, model B 12) for 20 minutes allows a stable aqueous dispersion of cotton cellulose microcrystals to be obtained. The yield for the preparation is about 60%.

In order to acetylate the cotton microcrystals obtained above, they must be dispersed in glacial acetic acid. This dispersion or suspension is obtained by replacing the water by acetic acid, by distillation in a rotary evaporator. The addition of acetic acid is stopped when the dispersion is destabilized and flocculates. Thus, the microcrystals are isolated by centrifugation. Their residual water content is lowered by successive operations of centrifugation (dilution with 100% acetic acid), down to a content of 0.2% by weight. A flocculated dispersion of microcrystals in pure acetic acid is obtained.

The cotton cellulose microcrystals are acetylated according to the following procedure:

50 g of a dispersion of microcrystals in glacial acetic acid (cellulose content: 1.4% by mass) are brought to 45° C. with stirring. A mixture of 0.11 g of 96% sulphuric acid, an amount of acetic anhydride necessary to neutralize the traces of water and 4.5 g of 100% acetic acid are then added. After 5 minutes, a mixture consisting of 1.86 g of 98% acetic anhydride and 3.60 g of 100% acetic acid is added. After acetylation for 7 minutes, the reaction medium is cooled in a bath of ice-water. 15 ml of an aqueous solution of acetic acid at 80% by weight are added to destroy the residual acetic anhydride and thus quench the acetylation of the microcrystals.

The acetylated microcrystals are separated from the reaction medium by freeze-drying, they are dialysed against water and are finally dried by freeze-drying.

The microcrystals have the following characteristics:

L/D=20 to 100

D=2 to 5 nm

Degree of acetylation of the surface hydroxyls=about 50%

Films of cellulose acetate are prepared according to the process described in Example 1, by mixing a dispersion in acetone of the acetylated cotton microcrystals with a collodion of cellulose acetate in acetone.

An increase in the Young's modulus is observed, which rises from 2.8 G Pa for a non-reinforced cellulose acetate film to 3.8 G Pa for a film containing 20% by weight of acetylated cotton microcrystals, and 4.4 G Pa with 25% filler.

On the other hand, the breaking strain decreases. This phenomenon is explained by the low L/D ratio for the cotton microcrystals.

EXAMPLE 3

Example 2 is repeated, but using parenchymal cellulose microfibrils as a source of cellulose. The microfibrils are obtained by mechanical homogenization of the cell walls of parenchyma from which the hemicellulose and the pectins have been removed.

The parenchymal cellulose microfibrils are acetylated at room temperature. 70 g of an acetic dispersion of microfibrils (cellulose content: 0.4% by mass) are added in a mixture of 11.2 g of 100% acetic acid and 11.2 g of 99% trifluoroacetic anhydride. The mixture is brought to 50° C. with stirring. The reaction is quenched at variable times as a function of the desired degree of acetylation. For example, the quenching should be carried out at t=4 days in order to obtain 35% acetylated microfibrils. At the chosen instant, the quenching is carried out by adding an excess of aqueous (80%) acetic acid.

The isolated acetylated parenchymal microfibrils are separated by freeze-drying and dried under vacuum at 80° C.

The microfibrils obtained have the following characteristics:

L/D: 3000 to 5000

D: 2 to 3 nm

Degree of acetylation of the surface: about 57%

Cellulose acetate films reinforced with acetylated parenchymal microfibrils are prepared according to the procedure described in Example 2.

The mechanical properties of the films are collated in Table II below:

TABLE II

| | Films with acetylated microfibrils | | | Films with non-acetylated microfibrils | | |
|---|---|---|---|---|---|---|
| % Filler | E (Gpa) | σ (MPa) | Elongation at break (%) | E (GPa) | σ (MPa) | Elongation at break (%) |
| 0 | 2.8 | 79 | 12 | 2.8 | 79 | 12 |
| 2 | 3.4 | 86 | 11 | 4.5 | 91 | 4 |
| 5 | 3.5 | 87 | 11 | — | — | — |
| 7 | 3.8 | 90 | 10 | — | — | — |
| 10 | 4.3 | 95 | 9 | — | — | — |

E = modulus of elasticity
σ = breaking strain

EXAMPLE 4: Dispersion of Cellulose Microcrystals

The cellulose microcrystals obtained after bleaching and chopping with sulphuric acid can be dispersed in water. Similarly, the parenchymal microfibrils can be dispersed in water since they carry charged pectin residues at their surface. These dispersions are stable, since it is possible for the microcrystals or microfibrils to adopt a liquid crystal behaviour. However, these microcrystals are not dispersible in organic solvents such as acetone or acetic acid.

In contrast, the surface-modified microcrystals in accordance with the present invention can be dispersed in acetone or acetic acid. This dispersibility can be explained by the acetyl groups present at their surface, in the case of acetylated microcrystals, these groups making the microcrystals compatible with the organic medium. The acetylated microcrystals have a liquid crystal behaviour when they are dispersed in acetone.

What is claimed is:

1. Surface-modified cellulose microfibrils having an L/D ratio of greater than 20 and an average diameter (D) of between 1 nm and 50 nm, L representing the length of the microfibrils and D their average diameter, wherein at least 25% of the hydroxyl functions present at the surface of the microfibril are esterified with at least one organic compound comprising at least one function which can react with the said hydroxyl functions.

2. Microfibrils according to claim 1, wherein at least 50% of the hydroxyl functions present at the surface of the microfibril are esterified.

3. Microfibrils according to claim 1, wherein the organic compound comprising at least one function which reacts with the hydroxyl functions of cellulose is a carboxylic acid, a carboxylic acid anhydride or a carboxylic acid halide comprising a saturated or unsaturated hydrocarbon group which optionally has one or more hetero atoms.

4. Microfibrils according to claim 3, wherein the hydrocarbon group has 1 to 20 carbon atoms.

5. Microfibrils according to claim 4, wherein the hydrocarbon group is methyl, ethyl, propyl, butyl, vinyl or a fatty chain.

6. Microfibrils according to claim 3, wherein said organic compound is acetic anhydride, butyric anhydride, acetyl chloride, butanoyl chloride or acetic acid.

7. Microfibrils according to claim 1, wherein said microfibrils have from 20 to 1000 cellulose chains organized in parallel.

8. A process for the manufacture of surface-modified cellulose microfibrils as defined in claims 1, comprising the steps of:

a) starting with cellulose microfibrils obtained by fibrillation of a material containing cellulose fibres, b) dispersing the cellulose microfibrils in a liquid medium which does not destructure the cellulose microfibrils to obtain a dispersion, c) adding to the dispersion an agent for esterifying the hydroxyl functions of the cellulose, d) quenching the esterification reaction after the desired degree of esterification is obtained, and e) extracting the partially esterified microfibrils from the dispersion.

9. A process according to claim 8, wherein the esterification agent is acetic acid, propionic acid, butyric acid, acrylic acid, methacrylic acid, acetic acid anhydride, propionic acid anhydride, butyric acid anhydride, acrylic acid anhydride, methacrylic acid anhydride, acetic acid halide, propionic acid halide, butyric acid halide, acrylic acid halide, or methacrylic acid halide.

10. A process according to claim 8, wherein in step c) a catalyst for the esterification reaction is further added.

11. A process according to claim 10, wherein the catalyst is an inorganic acid, an organic acid, or a tertiary amine.

12. A process according to claim 4, wherein the catalyst is sulphuric acid, perchloric acid, trifluoroacetic acid, trichloroacetic acid, or pyridine.

13. A process according to claim 8, wherein in step c) an activator for the esterification reaction is further added.

14. A process according to claim 13, wherein said activator is trifluoroacetic anhydride or trichloroacetic anhydride.

15. A process according to claim 8, wherein the liquid medium in step b) is carboxylic acid, an aliphatic optionally halogenated hydrocarbon, an aromatic optionally halogenated hydrocarbon, a polar aprotic solvent, or ethyl ether.

16. A process according to claim 8, wherein the microfibrils in step e) are extracted from the dispersion by centrifugation, freeze-drying, filtration or precipitation.

17. A method of use cellulose microfibrils as defined in claim 1, as reinforcing fillers or structuring agents in a composite material.

18. A composite material comprising a matrix and at least one reinforcing filler or a structuring agent, wherein all or a part of the reinforcing filler or of the structuring agent are cellulose microfibrils as defined in claim 1.

19. A composite material according to claim 18, wherein the matrix are cellulose esters or biodegradable polymers.

20. A composite material according to claim 19, wherein the biodegradable polymer is polyhydroxybutyrate or polyhydroxyvalerate.

21. A composite material according to claim 18, wherein the matrix is a cellulose acetate.

22. A composite material according to claim 18, wherein at least 50% of the hydroxyl functions present at the surface of the microfibrils are esterified.

23. A composite material according to claim 18, wherein the organic compound comprising at least one function which reacts with the hydroxyl functions of cellulose is a carboxylic acid, a carboxylic acid anhydride or a carboxylic acid halide comprising a saturated or unsaturated hydrocarbon group which optionally has one or more hetero atoms.

24. A composite material according to claim 23, wherein the hydrocarbon group has 1 to 20 carbon atoms.

25. A composite material according to claim 24, wherein the hydrocarbon group is methyl, ethyl, propyl, butyl, vinyl or a fatty chain.

26. A composite material according to claim 23, wherein said organic compound is acetic anhydride, butyric anhydride, acetyl chloride, butanoyl chloride or acetic acid.

27. A composite material according to claim 18, wherein said microfibrils have from 20 to 1000 cellulose chains organized in parallel.

* * * * *